US012755875B2

(12) United States Patent
Gaddam et al.

(10) Patent No.: US 12,755,875 B2
(45) Date of Patent: Oct. 6, 2026

(54) MODULAR RESISTOR GRID ASSEMBLY AND RESISTIVE GRID SYSTEM

(71) Applicant: Caterpillar Inc., Peoria, IL (US)

(72) Inventors: Pruthvi Raj Gaddam, Peoria, IL (US); Dennis Christopher Agee, Newark, TX (US); Drew Devlin Carlton, Peoria, IL (US); Dustin Scott Friedrich, Groveland, IL (US); Jacob Dean Randall, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 499 days.

(21) Appl. No.: 18/507,386

(22) Filed: Nov. 13, 2023

(65) Prior Publication Data

US 2025/0157705 A1 May 15, 2025

(51) Int. Cl.

| | |
|---|---|
| ***H01C 13/02*** | (2006.01) |
| ***B60L 7/02*** | (2006.01) |
| ***H01C 1/01*** | (2006.01) |
| ***H01C 1/082*** | (2006.01) |
| ***H01C 17/00*** | (2006.01) |

(52) U.S. Cl.

CPC ............... *H01C 13/02* (2013.01); *H01C 1/01* (2013.01); *H01C 1/082* (2013.01); *H01C 17/00* (2013.01); *B60L 7/02* (2013.01)

(58) Field of Classification Search

CPC .......... H01C 13/02; H01C 1/01; H01C 1/082; H01C 17/00

See application file for complete search history.

(56) References Cited

U.S. PATENT DOCUMENTS

| | | | | |
|---|---|---|---|---|
| 4,051,452 A | | 9/1977 | Luy | |
| 4,359,710 A | | 11/1982 | Luy | |
| 4,654,627 A | * | 3/1987 | Harkness ................ | H01C 3/10 338/319 |
| 4,847,585 A | * | 7/1989 | Kirilloff .................. | H01C 3/10 338/58 |
| 5,159,310 A | * | 10/1992 | Cummins ................ | H01C 1/08 338/290 |
| 8,692,647 B2 | | 4/2014 | Brown et al. | |
| 9,815,374 B2 | | 11/2017 | Widmer et al. | |

FOREIGN PATENT DOCUMENTS

| | | |
|---|---|---|
| CN | 106782946 A | 5/2017 |
| CN | 113682274 A | 11/2021 |
| JP | 2022105286 A | 7/2022 |

* cited by examiner

*Primary Examiner* — Kyung S Lee
(74) *Attorney, Agent, or Firm* — Foley & Lardner LLP (Dallas)

(57) ABSTRACT

Systems, apparatuses, and methods for a modular resistor grid system include a mount and a plurality of modular resistor grid assemblies that interchangeably couple to the mount. At least two modular resistor grid assemblies are in the plurality. Each has a housing and a plurality of resistor plates. Each housing has input and output terminals. Each plurality of resistor plates is connected between the input and the output terminal of a housing. Each resistor plate has a thickness, and each plurality of resistor plates provides a target electrical resistance for a modular resistor grid assembly. A first modular resistor grid assembly has a first number of resistor plates with a first thickness. A second modular resistor grid assembly has a second number of resistor plates with a second thickness. The first number of resistor plates is greater than the second number. The first thickness is greater than the second thickness.

20 Claims, 13 Drawing Sheets

MODULAR RESISTOR GRID ASSEMBLY AND RESISTIVE GRID SYSTEM

TECHNICAL FIELD

The present disclosure relates generally to a modular resistor grid system that includes a modular resistor grid assembly, such as a resistor grid assembly used for resistive braking in a machine. More specifically, the present disclosure relates to a modular resistor grid system configured to interchangeably receive modular resistor grid assemblies. The modular resistor grid assemblies may be formed from multiple modular resistor grids and may have overlapping electrical properties, different sizes, and different thermodynamic properties such that interchangeably coupling the modular resistor grid assemblies to the modular resistor grid system can achieve improved resistive braking capacity in variable operating environments, among other benefits.

BACKGROUND

Resistor grid systems used for dynamic braking in machines, such as electric and diesel-electric locomotives, off-highway machines, and other heavy equipment, are well known. Typically, the resistor grid system includes a plurality of resistor elements to dissipate the electric power generated during braking of the machine as heat. Thus, the resistor grid system may supplement the friction-based brakes and minimize the wear in friction-based braking components of the machine. However, the ability of a resistor grid system to dissipate heat may be reduced based on the component design of the system, ambient conditions surrounding the machine, and the altitude of machine operation. Improved resistor grid system designs are needed to increase the longevity of resistive braking systems and to allow for maximum braking capacity under varied operating conditions.

Further, existing resistor grid systems operate in environments prone to extreme conditions such as inclement weather, rain, exposure to dust and debris, and the like. Accordingly, wet conditions may lead to DC ground faults and other shortages which reduce resistive braking capacity. Further, current resistor grid systems fail to account for variations in machine operating conditions. Changes in altitude and corresponding changes in air density, for example, may reduce the resistive braking capacity of current resistive braking systems due to their inability to adapt based on the target operating locale or based on changes in ambient operating conditions. Modular resistor grid systems and elements are needed that can interchangeably vary in thermodynamic properties and system size while providing uniform resistive braking capacity to suit their environment of operation.

SUMMARY

One embodiment relates to a modular resistor grid system. The modular resistor grid system includes a mount and a plurality of modular resistor grid assemblies configured to interchangeably couple to the mount. The plurality of modular resistor grid assemblies includes at least a first modular resistor grid assembly and a second modular resistor grid assembly. Each of the plurality of modular resistor grid assemblies has, respectively, a housing and a plurality of resistor plates disposed therein. Each housing has an input terminal and an output terminal. Each respective plurality of resistor plates is connected between the input terminal and the output terminal of a respective housing. Each resistor plate has a thickness, and each plurality of resistor plates provide a target resistance for the respective modular resistor grid assembly between the input terminal and the output terminal. Further, each modular resistor grid assembly has the same target resistance. Additionally, the first modular resistor grid assembly has a first number of resistor plates with a first thickness, and the second modular resistor grid assembly has a second number of resistor plates with a second thickness. The first number of resistor plates is greater than the second number of resistor plates, and the first thickness is greater than the second thickness.

Another embodiment relates to a modular resistor grid system. The modular resistor grid system includes a mount, a fan, and a plurality of modular resistor grid assemblies configured to interchangeably couple to the mount and the fan. The plurality of modular resistor grid assemblies includes at least a first modular resistor grid assembly and a second modular resistor grid assembly. Each of the plurality of modular resistor grid assemblies has a housing, an input terminal, an output terminal, and a number of resistor rows. The input terminal and the output terminal are coupled to the housing. The number of resistor rows is disposed within the housing and connects the input terminal to the output terminal. Each of the resistor rows includes a plurality of resistor plates, with the resistor plates having a thickness. Each of the plurality of resistor plates provide a target resistance for the respective modular resistor grid assembly between the input terminal and the output terminal and each modular resistor grid assembly has the same target resistance. Further, the housing of the first modular resistor grid assembly extends a first length in an axial direction, and the housing of the second modular resistor grid assembly extends a second length in the axial direction less than the first length. The first modular resistor grid assembly includes a first number of resistor plates that each has a first thickness, and the second modular resistor grid assembly includes a second number of resistor plates that each has a second thickness. Additionally, the first number of resistor plates is greater than the second number of resistor plates, and the first thickness is greater than the second thickness.

Still another embodiment relates to a method of manufacturing a modular resistor grid assembly. The method includes providing a plurality of first resistor plates having a first thickness, coupling a first number of first resistor plates to an input terminal and an output terminal of a first housing to form a first modular resistor grid, and coupling together two or more first modular resistor grids to form a first modular resistor grid assembly. Further, the first modular resistor grid assembly has a first target resistance and a first axial length. The method also includes providing a plurality of second resistor plates having a second thickness, coupling a second number of second resistor plates to an input terminal and an output terminal of a second housing to form a second modular resistor grid, and coupling together two or more second modular resistor grids to form a second modular resistor grid assembly. Similarly, the second modular resistor grid assembly has a second target resistance and a second axial length. Additionally, the first target resistance is equal to the second target resistance, the first thickness is greater than the second thickness, the first number of first resistor plates is greater than the second number of second resistor plates, and the first axial length is greater than the second axial length.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
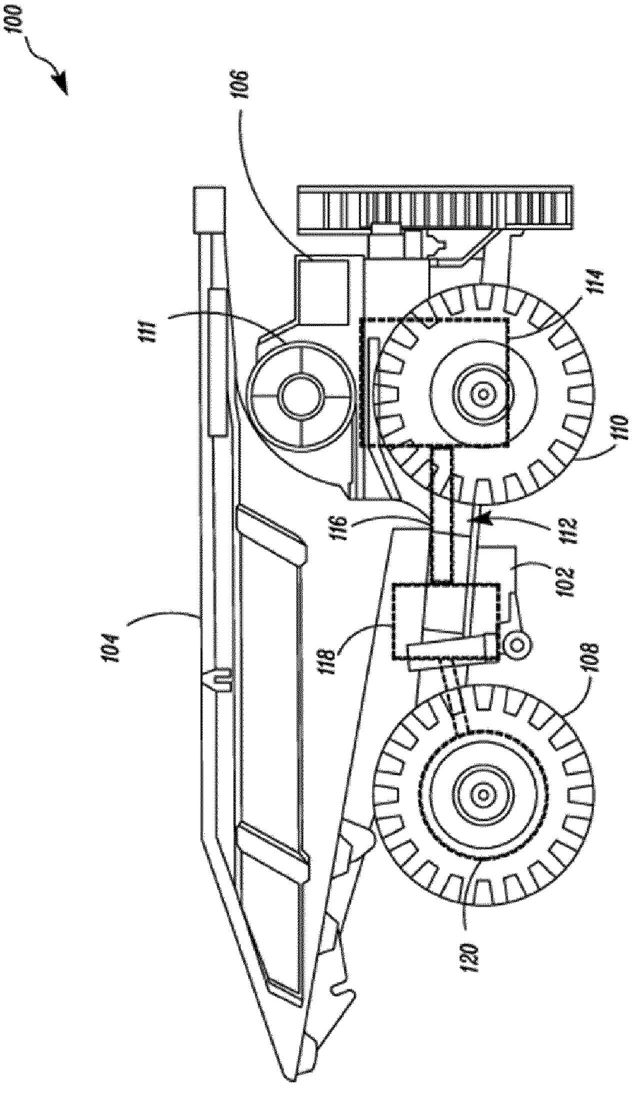
FIG. 1 illustrates a side view of a machine, according to an aspect of the present disclosure.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a modular resistor grid system includes a mount, a fan, and a plurality of modular resistor grid assemblies configured to interchangeably couple to the mount and the fan. The plurality of modular resistor grid assemblies includes at least a first modular resistor grid assembly and a second modular resistor grid assembly. Each of the plurality of modular resistor grid assemblies has a housing, an input terminal, an output terminal, and a number of resistor rows and/or resistor plates disposed within the housing and connecting the input terminal to the output terminal. The resistor rows may include, and the resistor plates may be components of, resistor elements that include first and second insulators. While each of the plurality of modular resistor grid assemblies is configured to interchangeably couple to (e.g., to be compatible with a resistive braking system including) the mount and the fan, respective modular resistor grid assemblies may vary in certain physical, electrical, and thermodynamic properties to suit particular environments of machine operation.

For example, and as discussed herein, the first modular resistor grid assembly and the second modular resistor grid assembly may vary in (i) the number of resistor plates disposed within the housing, (ii) the thickness of the resistor plates disposed within the housing, and (iii) the axial length of the housing. Further, the first modular resistor grid assembly and the second modular resistor grid assembly may vary in (iv) respective watt-densities of the modular resistor grid assemblies, (v) a number of modular resistor grids coupled together to form the respective modular resistor grid assemblies, and (vi) a number of resistor rows disposed within the respective modular resistor grid assemblies. Also, the first modular resistor grid assembly and the second modular resistor grid assembly may be similar and share at least (i) the same target resistance between the input terminal and the output terminal, (ii) the same radial height (e.g., size of an inner radius of the housing and/or size of the outer radius of the housing, and (iii) the form and structure of insulators within each respective housing. Beneficially, the interchangeable quality of the modular resistor grid assemblies and the similarities in form and structure allow for common insulator tooling, common resistor element tooling, common cooling fan (e.g., blower) assemblies, and common mounting features (e.g., frames, fan mounts, and the like) to be used across a fleet of machines. Common tooling and overlapping structural components saves costs associated with fabrication, assembly, and installation of the modular resistor grid system.

Additionally, the variability and interchangeability of the modular resistor grid assemblies within the modular resistor grid system beneficially allows for particular modular resistor grid assemblies to be interchanged into the modular resistor grid system to suit changes in a machine's environment of operation. For example, at high altitudes, air density is lower than air density at lower altitudes. Accordingly, a machine operating a fan to cool a modular resistor grid assembly will provide equal volumetric flow rates of cooling air at both altitudes, however the mass flow rate of air through the high-altitude modular resistor grid assembly may be substantially less than the mass flow rate of air through the low altitude modular resistor grid assembly due to the difference in air density. Accordingly, a machine would benefit from including a modular resistor grid assembly having a lower watt-density of power dissipation and a larger axial length (e.g., surface area for heat convection) at the high-altitude location. Similarly, the machine at the lower altitude location would benefit from having a higher-watt density of power dissipation and a smaller axial length (e.g., surface area for heat convection) to achieve the same resistive braking capacity while reducing machine mass and occupied space. The apparatuses, systems, and methods disclosed herein allow for interchangeable adaptation of resistive braking assemblies to optimize physical, electrical, and thermodynamic properties of a machine's resistive braking system based on such changes to the machine's operating environment. In short, machines may benefit, for example, from a modular resistive braking system with compatible/exchangeable components that may be interchangeably connected to optimize resistive braking capacity and performance across a variety of working environments without requiring extensive replacement of all parts of the resistive braking system.

Exemplary Electric Drive Machine

A machine 100 in which disclosed embodiments may be implemented is schematically illustrated in FIG. 1. The machine 100 may be generically described as any machine having an electric drive which may be connected to one or more drive wheels. The machine 100 may include a vehicle such as a diesel engine locomotive, a subway tram, an off-highway truck or a vehicle used in mining, construction, quarrying, and other applications. However, it will be apparent, any other vehicle having an electric drive or an electric-only arrangement may be included in the machine 100.

For the purpose of the present disclosure, in FIG. 1, the machine 100 is illustrated as an off-highway truck. The machine 100 may include a chassis 102 to support various components of the machine 100. The machine 100 may include a dump body 104 supported on the chassis 102. The chassis 102 may further support an operator cab 106 defined as an enclosure. An operator occupying the operator cab 106 may control various functions of the machine 100 by issuing various operator commands by means of controls such as a joystick, a lever, a touch-based user interface, or the like.

The machine 100 may further include a set of drive wheels 108 to propel the machine 100. In an embodiment, a set of idle wheels 110 may also be provided to steer the machine 100 in different directions. Further, the machine 100 may also include an articulated chassis for steering. Together, the set of drive wheels 108 and the set of idle wheels 110 may act as the ground engaging members for the machine 100. As illustrated in FIG. 1, the machine 100 also includes a modular resistor grid system 111 positioned adjacent to the operator cab 106 in the machine 100. However, it may be apparent, the modular resistor grid system 111 may be positioned anywhere based on the design and the available space in the machine 100.

The machine 100 of the present disclosure may be an electric machine having an electric drive 112. The electric drive 112 may provide the electric power to drive various components in the machine 100. In an embodiment, the electric power may be generated onboard by a generator, alternator, or another power-generation device, which may be driven by an engine or any other power source. Alternatively, the electric power may not be generated onboard but supplied externally from an overhead conductor via a pantograph trolley, a battery, a series of capacitors, or the like to drive the machine 100.

In the illustrated embodiment, the electric drive 112 includes a power source 114, which may be an engine, for example, an internal combustion engine such as a diesel engine, a gasoline engine, a natural gas engine or the like. The power source 114 may provide an output torque at an output shaft 116 in the machine 100. The output shaft 116 may be connected to a generator 118, which may be a multiple-phase alternating current (AC) synchronous alternator. During operation, the output shaft 116 rotates a rotor of the generator 118 to produce electric power, for example, in the form of alternating current (AC). This generated electric power may be used to run a plurality of drive motors 120 coupled directly or via intermediate assemblies to the set of drive wheels 108. For the purpose of the present disclosure, the drive motors 120 may be variable speed, reversible AC motors.

Exemplary Electric Drive and Dynamic Braking System

Figure 2:
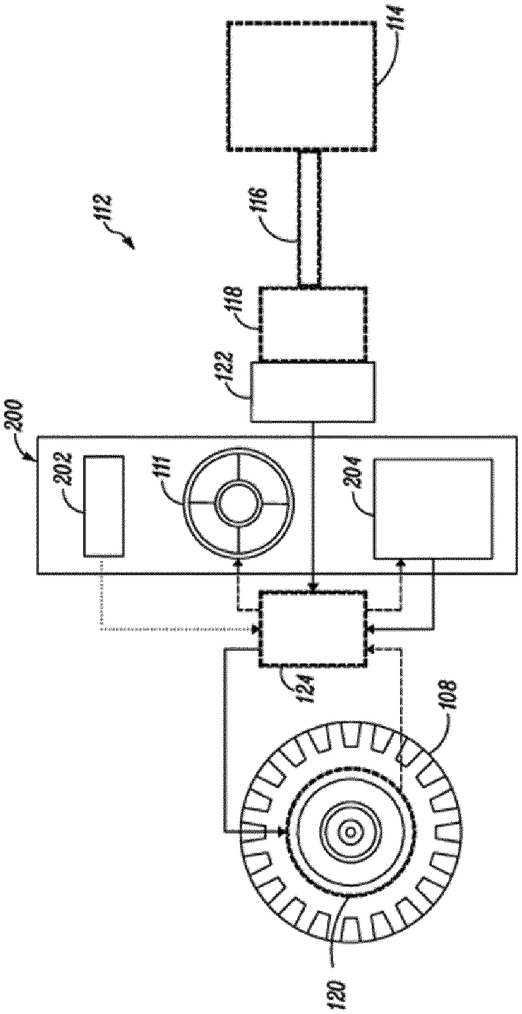
FIG. 2 illustrates a schematic diagram of an electric drive for the machine of FIG. 1.

A schematic of the electric drive 112 is illustrated in FIG. 2. The electric drive 112 of the present disclosure may be a direct series drive. FIG. 2 illustrates an exemplary arrangement of various components of the electric drive 112 in the machine 100. In the schematic diagram, the flow direction of the electric power in the system is denoted by arrows. The solid-lined arrows denote the flow of the electric power when the machine 100 is being propelled. Conversely, the flow of the electric power during a braking mode of the machine 100 is denoted by dash-lined arrows in FIG. 2. While the dotted line arrow designates control line connection between components of the electric drive 112.

A person skilled in the art will understand that the generator 118 may produce electric power in the form of alternating current (AC) power. This electric power may be supplied to a rectifier 122 and converted to direct current (DC) power. The rectified DC power may be converted again to AC power by an inverter circuit 124. The inverter circuit 124 may be capable of selectively adjusting the frequency and/or pulse-width of the output, such that the drive motors 120 that are connected to an output of the inverter circuit 124 may be operated at variable speeds. In an embodiment, a plurality of inverter circuits 124 may be disposed in connection with the drive motors 120 in the machine 100.

FIG. 2 further illustrates a dynamic braking system 200 for the machine 100. The dynamic braking system 200 may be in connection with the drive motors 120 of the machine 100. Specifically, the dynamic braking system 200 may be operatively disposed in connection with the inverter circuit 124 in the machine 100. The dynamic braking system 200 may be configured to retard the propulsion of the machine 100 during braking mode as per an operator command in the machine 100.

According to the present disclosure, the dynamic braking system 200 may include a control unit 202, which may be a combination of, but not limited to, a set of instructions, a Random Access Memory (RAM), a Read Only Memory (ROM), flash memory, a data structure, and the like. The control unit 202 may be configured to receive the operator command in the machine 100. Further, the control unit 202 may determine whether to put the machine 100 in the braking mode or not, based at least in part on the operator command. To initiate braking of the machine 100, the control unit 202 may generate a braking signal (illustrated by dotted line) for the inverter circuit 124.

The braking signal may be received by the inverter circuit 124 in the machine 100. The braking signal may carry instructions to reverse a torque polarity of the drive motors 120. This makes the drive motors 120 to act as generators, using the mechanical power in the form of rotational energy from the set of drive wheels 108 to produce electric power. This electric power may be supplied back to the electric drive 112 in the machine 100.

The dynamic braking system 200 may further be configured to provide regenerative braking in the machine 100. For this purpose, the dynamic braking system 200 may include an energy storage unit 204. The energy storage unit 204 may include a battery, a plurality of capacitors or the like disposed in connection with the drive motors 120 in the electric drive 112. As during braking mode, the drive motors 120 may produce electric power, the energy storage unit 204 may store this electric power for later use in the machine 100.

The present disclosure is applicable to many machines, for example, a large off-highway truck, such as a dump truck, which are commonly used in mines, construction sites and quarries. The machine 100 may have a high payload capability and a travel speed of a few miles per hour when fully loaded. The machine 100 may further be required to operate in a variety of environments, at a variety of altitudes, and to negotiate steep inclines in dry or wet conditions.

Typically, to halt or slow down such machines, friction-based brakes coupled to the set of drive wheels and idle wheels are used. These friction-based brakes are effective but may wear out with prolonged use. To overcome this, the dynamic braking system 200 of the machine 100 of the present disclosure may work in combination with or without these friction-based brakes. The dynamic braking system 200 may supplement these friction-based brakes in the machine 100 and thus helps in reducing the wear of such brakes.

The dynamic braking system 200 may act on the operator command to put the machine 100 in the braking mode. Specifically, the operator command may be received by the control unit 202 in the dynamic braking system 200. The control unit 202 generates the braking signal determined at least in part by the operator command. This determination or calculation may be based on various operating parameters of the machine 100, such as, the current speed, the current payload, the rate of acceleration, the desired speed and so forth.

Subsequently, the braking signal may be received by the inverter circuit 124 in the electric drive 112 of the machine 100. In the braking mode, the electric drive 112 may switch the torque polarity of the drive motors 120, which makes the drive motors 120 to act as generators. In this mode, the drive motors 120 may use the power from the set of drive wheels 108, which ultimately discharges the mechanical energy of the set of drive wheels 108 and achieves retarding of the machine 100. Further, the drive motors 120, consuming the mechanical power from the set of drive wheels 108, may generate electric power in the electric drive 112.

This generated electric power may be fed to the dynamic braking system 200 in the electric drive 112. The generated electric power, which may be in the form of AC, may be fed via the inverter 124 which converts AC electric power into DC electric power. In an embodiment, with the machine 100 having regenerative braking, a part of the generated electric power may be supplied to the modular resistor grid system 111 to be dissipated as heat and the remainder of the generated electric power may be supplied to the energy storage unit 204 for later use in the machine 100.

Exemplary Components and Configuration of a Modular Resistor Grid System

Figure 3:
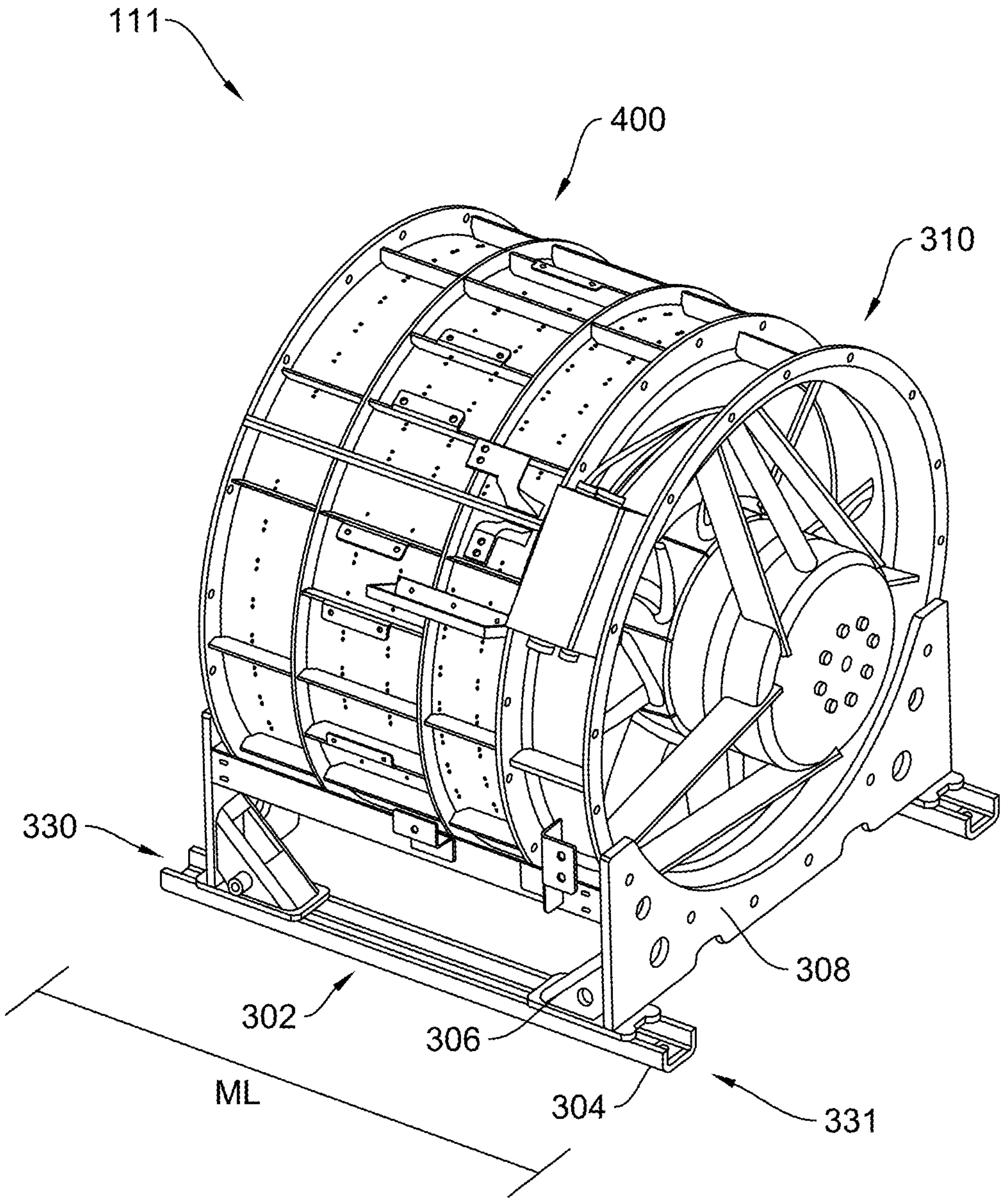
FIG. 3 illustrates a perspective view of one configuration of a modular resistor grid system and components thereof.
Figure 4:
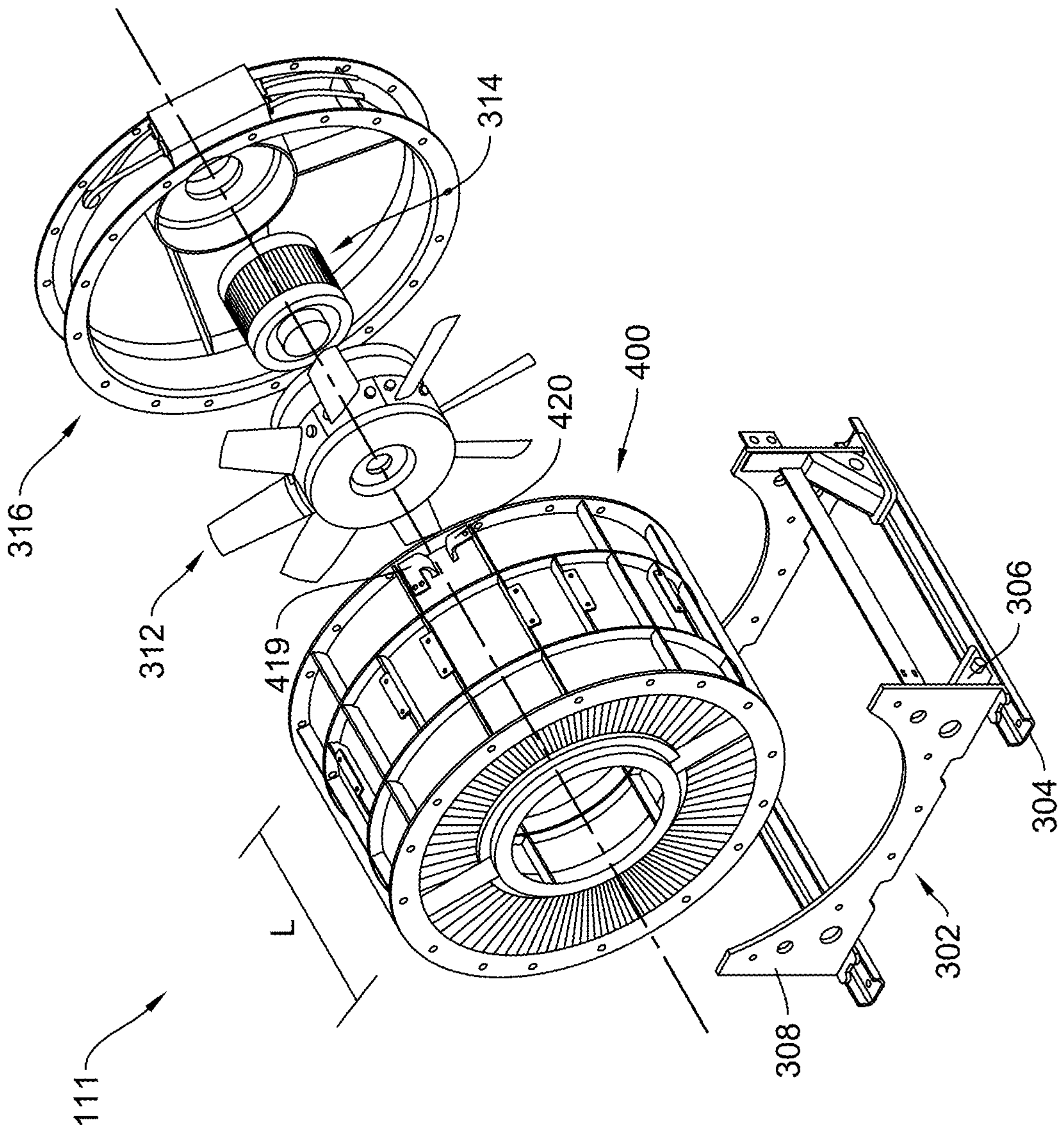
FIG. 4 illustrates an exploded view of the exemplary configuration of the modular resistor grid system of FIG. 3.

The dynamic braking system 200 may include the modular resistor grid system 111 disclosed herein. The modular resistor grid system 111 may dissipate some or all of the generated electric power in the form of heat. FIG. 3 illustrates a perspective view of an exemplary configuration of the modular resistor grid system 111, according to an aspect of the present disclosure. FIG. 4 illustrates an exploded view of the exemplary configuration of the modular resistor grid system 111 of FIG. 3.

Referring to FIGS. 3 and 4, the modular resistor grid system 111 includes a mount 302, a fan 310, and a modular resistor grid assembly 400 of a plurality of modular resistor grid assemblies 400. The mount 302 may be permanently or removably coupled to the machine 100. The mount 302 provides a support structure upon which the other components of the modular resistor grid system 111 may be secured, connected, and/or coupled to the dynamic braking system 200 of the machine 100. The mount 302 may include a frame 304 and one or more brackets 306. The frame 304 may include rigid supporting members such as bars, rails, posts, tracks, or other suitable elements to affix the components of the modular resistor grid system 111 to the machine 100. The frame 304 may have a first end 330 and a second end 331 defining a mount length ML therebetween. The mount length ML may be a sufficient size to allow resistor grid assemblies of varying axial lengths to interchangeably connect to the mount 302. In this way, the mount 302 may allow an operator to remove components of the modular resistor grid system 111 and exchange them with components that occupy less or greater space depending on the environment of operation. The brackets 306 may be selectively movable brackets 306 such that one or more brackets 306 can be fastened to a first position along the frame 304, loosened, allowed to slide along the length of the frame 304 to a second position, then tightened to secure the bracket 306 in the second position. In this way, the brackets 306 may accommodate and couple to modular resistor grid assemblies 400 of varying axial length L or size. The brackets 306 may also include a mounting feature 308 configured to align or abut with the components of the modular resistor grid system 111 such that the components may be fastened together by bolts, welds, or other suitable fasteners. For example, in FIGS. 3 and 4, movable brackets 306 are coupled to mounting features 308 that are shaped to fit the cylindrical profile of the exemplary modular resistor grid system 111. By moving the brackets 306 and mounting features 308, multiple modular resistor grid assemblies 400 of varying axial length L may be interchangeably coupled to the mount 302 by sliding and securing the movable brackets 306 as needed along the frame 304. Additionally, the movable brackets 306 may allow the fan 310 to couple at one or more locations along the mount length ML.

The modular resistor grid system 111 also includes a fan 310. The fan 310 is configured to blow cooling air through the modular resistor grid assembly 400 in order to dissipate heat, for example, during a resistive braking mode of the machine 100. In some embodiments, the fan 310 may include a blower, a pressurized air source, a coolant delivery source, or the like. The fan 310 may include a blade assembly 312 configured to direct air towards or through the modular resistor grid assembly 400 as the blade assembly 312 rotates. A power source 314 (e.g., a motor, battery, etc.) may power the fan 310, and a hub assembly 316 may direct air towards the modular resistor grid assembly 400 and/or encase and protect the components of the fan 310.

The modular resistor grid system 111 includes a modular resistor grid assembly 400. The modular resistor grid assembly 400 facilitates resistive braking by receiving and dissipating power from the machine 100 in the form of heat. In some embodiments, the modular resistor grid assembly 400 may be formed by as a single unit or may be formed from a single modular resistor grid 402. In other embodiments, the modular resistor grid assembly 400 may be formed by coupling together two or more modular resistor grids 402 (See, e.g., FIGS. 5 and 6 discussed below). The modular resistor grid assembly 400 includes a housing 404 which may provide support to various elements of the modular resistor grid system 111. In the illustrated example of FIGS. 3-5, the housing 404 has a cylindrical shape having an inner wall 406 and an outer wall 408. The housing 404 may be in any shape and may divided into one or more modular sections. For example, the housing 404 of the modular resistor grid assembly 400 may be formed by coupling together two or more modular resistor grids 402, each having a housing 404 encasing one or more resistor elements 410. The modular resistor grids 402 may be cylindrical, semicylindrical, quadrant-shaped, wedge-shaped, triangular, or other suitable shapes. The number of subsections of housing 404 and the number of individual modular resistor grids 402 that may be coupled together to form the modular resistor grid assembly 400 may vary depending on the space constraints of the machine 100 and the electrical and thermodynamic properties desired at a particular working environment (e.g., lower watt-density for higher altitude, smaller axial length for lower altitudes, etc.).

Figure 5:
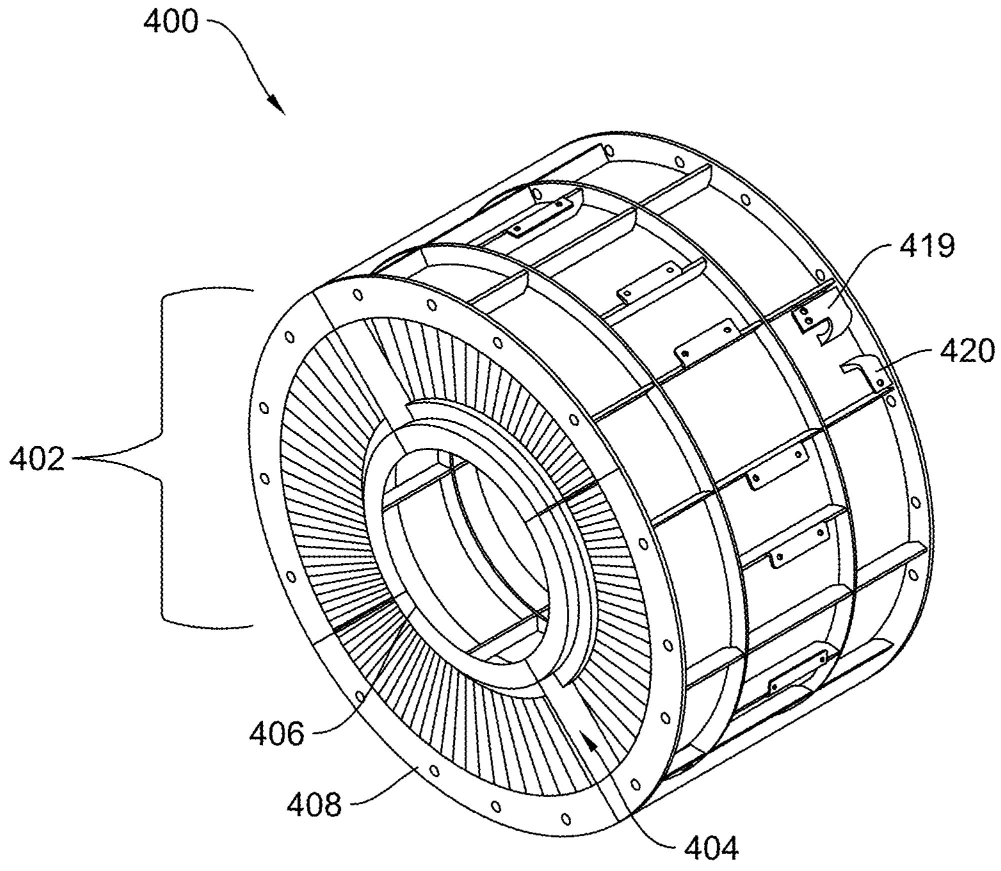
FIG. 5 illustrates a perspective view of an example modular resistor grid assembly of the plurality of modular resistor grid assemblies disclosed herein.
Figure 6:
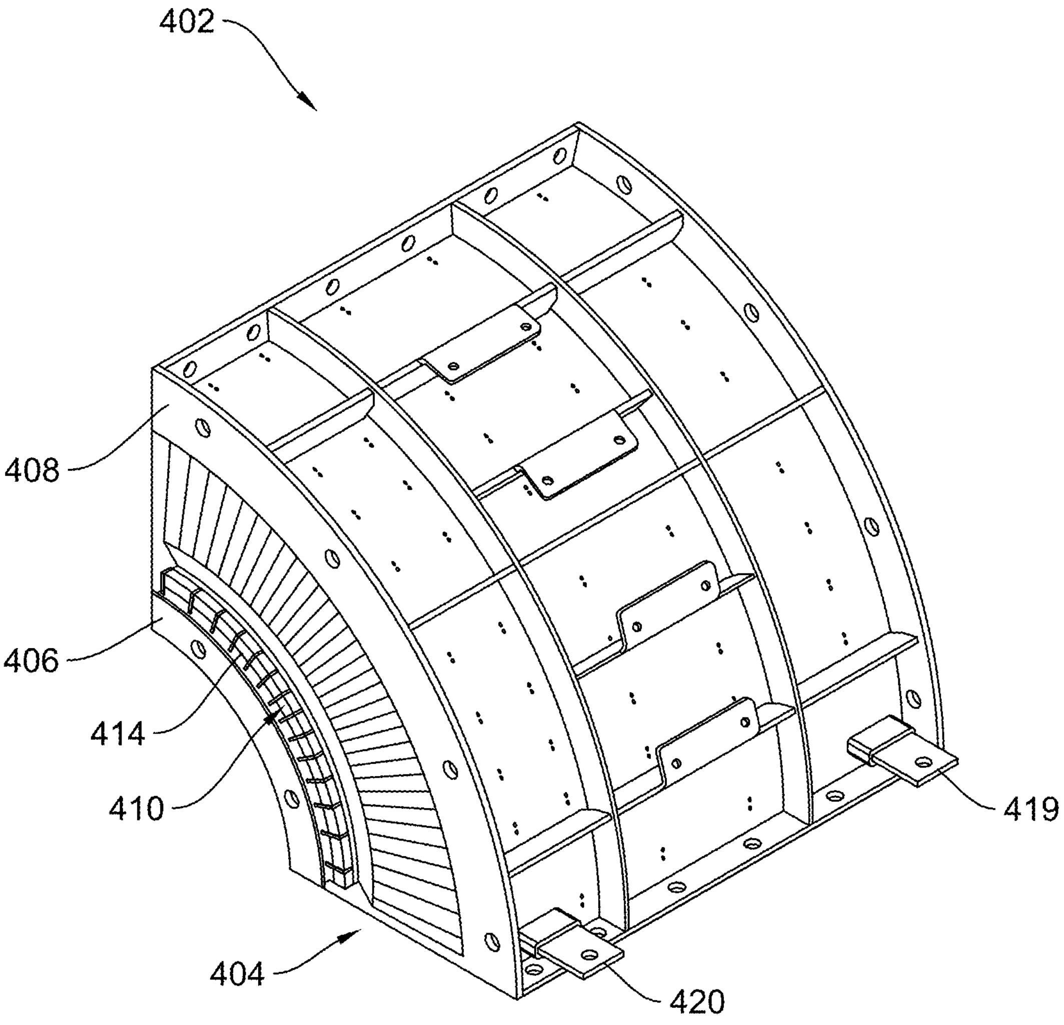
FIG. 6 illustrates perspective view of a modular resistor grid of the modular resistor grid assembly of FIG. 5.

For example, FIG. 5 and FIG. 6 illustrate an embodiment of one modular resistor grid assembly 400 that is divided into four quadrant-shaped modular resistor grids 402, which are assembled with each other in the machine 100. The modular resistor grid assembly 400 and the modular resistor grid 402 include at least one resistor element 410 disposed between the inner wall 406 and the outer wall 408 of the housing 404. The modular resistor grid assembly 400 and/or the modular resistor grid 402 may include two or more resistor elements 410 (e.g., a plurality of resistor elements 410) that are closely packed in a stacked configuration abutting in an end-to-end orientation. The two or more resistor elements 410 form a conductive path between an input terminal 419 and an output terminal 420 of the modular resistor grid assembly 400. The resistor elements 410 may be uniformly arranged in the housing 404 to maintain air spaces between each other. This uniform spacing provides for flow of cooling air between the resistor elements 410 in the modular resistor grid system 111. Moreover, one or more cooling air vents may be provided in the housing 404 for circulation of cooling air in the modular resistor grid system 111.

Figure 7:
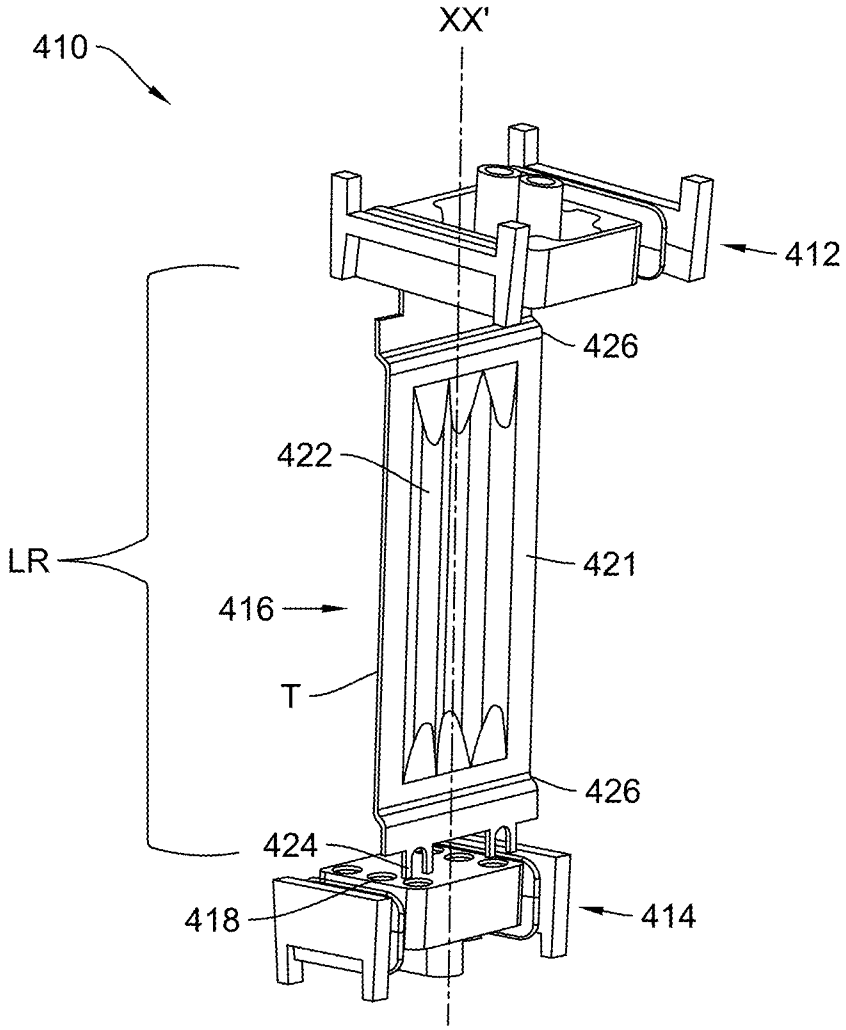
FIG. 7 illustrates a perspective view of a resistor element.

FIG. 7 illustrates an exemplary resistor element 410. The resistor element 410 includes a first insulator 412, a second insulator 414, and one or more resistor plates 416 mounted to the first insulator 412 and the second insulator 414. In the example illustrated, one resistor plate 416 is mounted between the first insulator 412 and the second insulator 414 and extends therebetween. The first insulator 412 and the second insulator 414 may be affixed to the inner wall 406 and the outer wall 408, respectively, of the housing 404 of the modular resistor grid assembly 400 and/or the modular resistor grid 402. One or more resistor plates 416 may be received in slots, holders, ridges, or other mounting features (e.g., apertures 418) formed in the first insulator 412 and the second insulator 414. In this way, resistor plates 416 may be connected at or near the apertures 418 to form a continuous conducting path of resistor plates 416 configured to dissipate electric energy as heat during a resistive braking mode. Further, the one or more resistor elements 410 may be arranged in one or more rows, substantially parallel to each other in a close face-to-face relationship forming an axial airflow path therebetween. For example, multiple resistor plates 416 of multiple resistor elements 410 may be connected in series within each modular resistor grid 402 and/or each modular resistor grid assembly 400 to provide a continuous current path between an input terminal 419 and an output terminal 420 (See FIGS. 5 & 6) of the modular resistor grid 402 and/or the modular resistor grid assembly 400. For this purpose, a conducting member may be disposed in the housing 404, electrically connecting the two or more resistor plates 416 in the modular resistor grid system 111. The conducting member may be a conductive wire, a weld, etc. For example, in some embodiments, the conducting member includes a seem weld between abutting portions of adjacent resistor plates 416. Additionally, conductive connectors may also be disposed between a resistor element 410 and an input terminal 419, between a resistor element 410 and an output terminal 420, and/or between the ends of two rows of resistor elements 410 to electrically connect multiple resistor plates 416 within the housing 404. The conductive connectors may include conductive (e.g., metallic) plates, switches, wires, terminals, bus bars, or other suitable electrical connectors. The resistor elements 410 may be connected in a manner such that the modular resistor grid system 111 may have two current circuits, a contactor power circuit and a chopper power circuit.

As illustrated, the first insulator 412 and the second insulator 414 may be in the shape of a block made of insulating material such as silicon bonded laminated mica, ceramic, glass reinforced material, etc. However, other suitable materials with insulating properties may be used to form the first insulator 412 and the second insulator 414. Similarly, the first insulator 412 and second insulator 414 may be formed in a variety of shapes such as blocks, blocks separated by winged or flared connectors, arcuate shapes, round, triangular, hexagonal shapes and the like. Preferably, the shape and profile of the first insulator 412 and the second insulator 414 are configured to allow air to flow freely in an axial direction relative to the housing 404 and across a large, exposed surface area of the resistor elements 410 when assembled within the housing 404. Additionally, the first insulator 412 and the second insulator 414 may be shaped to achieve a predetermined electrical property (e.g., creepage, clearance, etc.) between conductors of the modular resistor grid assembly 400. The first insulator 412 may be affixed to the outer wall 408 of the housing 404 by some fastening member, such as, nuts and bolts, screws, etc. The second insulator 414 may be similarly fastened to the inner wall 406 of the housing 404. The first insulator 412 and the second insulator 414 may each include one or more mounting features (e.g., apertures 418) formed therein and configured to receive one or more resistor plates 416. Further, the apertures 418 may not extend entirely through the first insulator 412 or the second insulator 414 and may be configured to receive a tip portion 424 of a resistor plate 416 and mount the resistor plate 416 between the first insulator 412 and the second insulator 414.

The resistor plate 416 may be formed of a resistive material, such as stainless steel, carbon, nichrome, tungsten, ceramics, polymeric materials, graphite, semiconductors, metal oxides, photocells, resistive inks, or any other resistive material. The resistor plate may take a variety of shapes and be contoured to increase surface area exposed to air flowing through the housing 404 for thermal convection. For example, the resistor plate 416 may be a continuous strip of resistive material such as stainless steel. The resistor plate 416 may include a body portion 421 extending along a longitudinal direction XX' of the resistor plate 416. In an embodiment, the resistor plate 416 may also include a series of reflexed portions 422 disposed at opposite longitudinal sides in the body portion 421 of the resistor plate 416. In an exemplary configuration, the resistor plate 416 may extend a length, LR, of about 150 millimeters to about 200 millimeters along the longitudinal direction XX'. In a specific example, the resistor element 410 may have a length LR of about 175 millimeters. The resistor plate 416 may have a tip portion 424 disposed at an end 426 of the body portion 421. Alternatively, the resistor plate 416 may include two or more tip portions 424 disposed from both the ends 426. The tip portions 424 may include curved profiles configured to abut the tip portions 424 of an adjacent resistor plate 416 to be fastened together via a seem weld, clamp, binding, pin, cover, or the like. The tip portions 424 of the resistor plate 416 may be adapted to be received in the apertures 418 of the first insulator 412 and the second insulator 414. The apertures 418 may provide some clearance for movement of the tip portions 424 within. This allows for the resistor plate 416 to move in the longitudinal direction XX' in the resistor element 410 upon thermal expansion and thermal contraction.

The resistor plate 416 may also include a thickness, T, as shown in FIG. 7. The thickness T may be determined based on a thickness of a material sheet (e.g., stainless steel) from which the resistor plate 416 is formed. The resistor plate 416 may be formed by stamping, molding, laser cutting, water jet cutting, and the like. Various dies, molds, etc. may be utilized to form resistor plates 416 having substantially similar or identical lengths LR, profiles, and geometries that vary in thickness T. For example, one resistor element 410 may have a length LR, a resistor plate 416 having adjacent reflexed portions 422, and tip portions 424. Another resistor element 410 may have the same length LR, may likewise have reflexed portions 422 and tip portions 424, but may have a different thickness T than the first insulator (e.g., if the second resistor element 410 was formed from thicker plate material). It will be appreciated that, given two resistor elements with similar or identical lengths, geometries, and profiles but varying thicknesses, the resistor element with the greater thickness will generally have less electrical resistance between its tip portions than the resistor element with the smaller thickness. In other words, the resistor element 410 and/or the resistor plate 416 may be approximated as a wire with its resistance calculated as $R=\rho(L/A)$.

During a resistive braking mode, the generated electric power may pass into the modular resistor grid system 111 via the input terminal 419. The generated electric power may flow through the resistor plates 416 in the resistor element 410 of the modular resistor grid system 111, to be dissipated as heat. Specifically, the heat is generated by the body portion 421 of the resistor plate 416. This generated heat may be radiated to the first insulator 412 and the second insulator 414 and raise the temperature of the first insulator 412 and the second insulator 414 in the resistor element 410. The normal continuous operating temperature for the first insulator 412 and the second insulator 414 may be in the range of 300 to 400 degrees Celsius, according to industry standards. For short intervals, the temperature of the first insulator 412 and the second insulator 414 may reach higher values due to surges, but if the temperature rises above a critical or maximum operating temperature for extended periods of time, the lifetime of the first insulator 412 and the second insulator 414 may be greatly reduced.

Exemplary Modular Resistor Grid System and Modular Resistor Grid Assemblies

Figure 8:
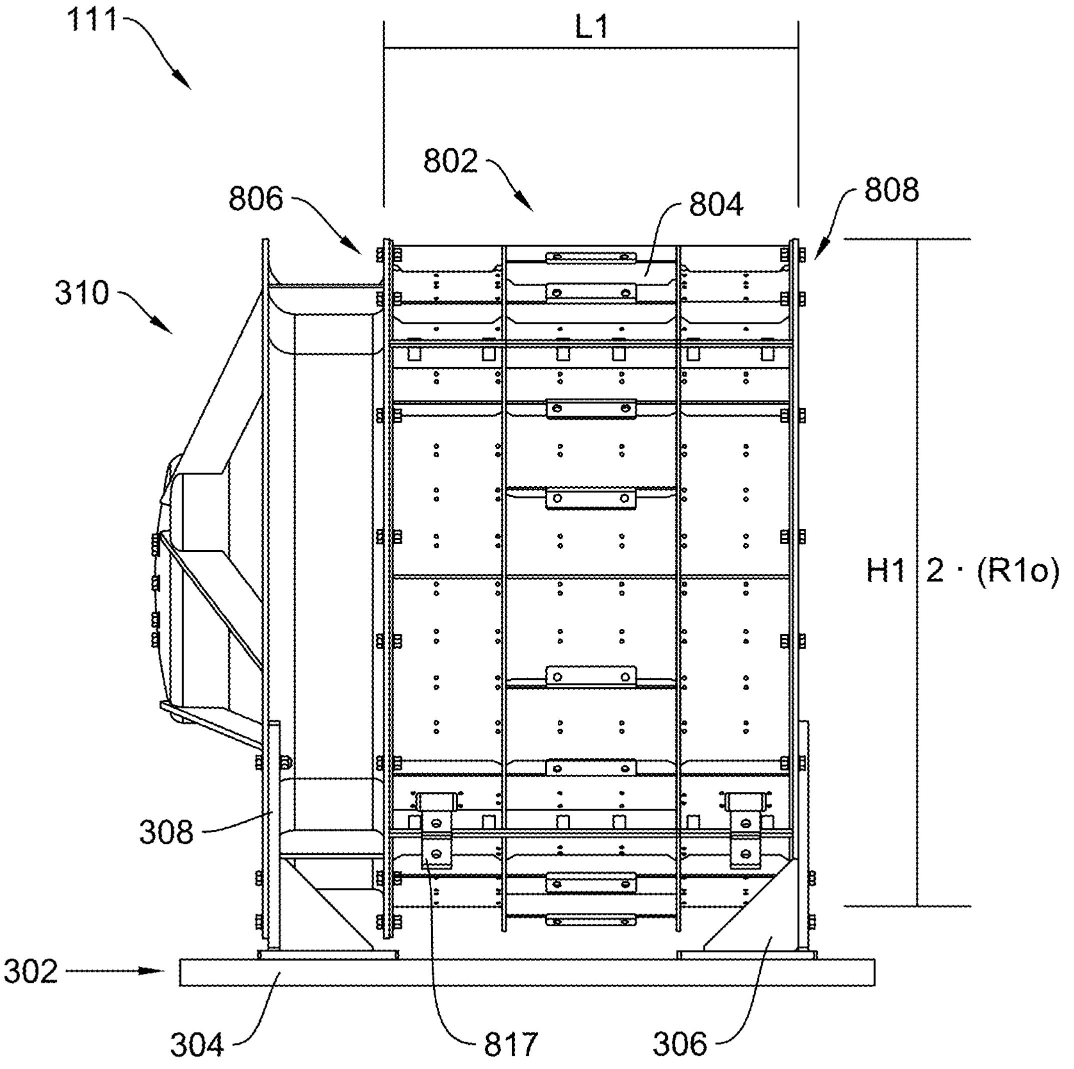
FIG. 8 illustrates a side view of the modular resistor grid system interchangeably coupled to a first modular resistor grid assembly, according to an aspect of the disclosure.

Turning to FIG. 8, a modular resistor grid system 111 is illustrated from a side view. The modular resistor grid system 111 in FIG. 8 includes the mount 302 and a first modular resistor grid assembly 802 shown coupled to the mount 302 and the components thereof (e.g., the frame 304, one or more movable brackets 306, and the mounting feature 308). The first modular resistor grid assembly 802 may be formed from one or more of a first modular resistor grid 902, such as the first modular resistor grid 902 shown in FIG. 9. The first modular resistor grid assembly 802, as discussed above, may take on various shapes and sizes (e.g., cylindrical, semicylindrical, quadrant-shaped, wedge-shaped, triangular, or other suitable shapes). In the example shown in FIG. 8 and FIG. 9, the first modular resistor grid assembly 802 is formed by coupling together four quadrant-shaped first modular resistor grids 902 to form a cylindrically shaped first modular resistor grid assembly 802 that may removably couple to the modular resistor grid system 111.

The first modular resistor grid assembly 802 includes a first housing 804. The first housing 804 provides a protective shell inside which the components (e.g., resistor elements 410 may be securely disposed, partially shielded from debris, dust, moisture, etc.). The first housing 804 may couple to the fan 310 and/or the mounting feature 308. In this way, the first housing 804 may allow the first modular resistor grid assembly 802 to be positioned such that cooling air from the fan flows in an axial direction between an inlet 806 and an outlet 808 of the first modular resistor grid assembly 802 and across the surface area of multiple resistor elements 410 within the first housing 804. The first housing 804 may also define one or more air vents or flow paths to further facilitate convective cooling of the resistor elements 410 disposed therein. Like those shown in FIGS. 4 and 5, the first housing 804 includes a first input terminal and a first output terminal (located on the opposite side of the first housing 804 in FIG. 8 and corresponding to input terminal 419 and output terminal 420 shown in FIG. 4) configured to electrically connect the modular resistor grid system 111 to a machine 100 (e.g., to a dynamic braking system 200 or a resistive braking system of the machine 100). The terminals 817 shown in FIGS. 8 and 9 may be configured to electrically connect multiple first modular resistor grids 902 of the first modular resistor grid assembly 802 such that one (in series configurations) or more (in parallel configurations) conducting paths extend between the first input terminal and the first output terminal. In other words, the terminals 817 electrically connect the first modular resistor grids 902 of the first modular resistor grid assembly 802 together. In some embodiments, the terminals 817 may be connected via jumper cables, bus bars, or other suitable conductive connectors.

Figure 9:
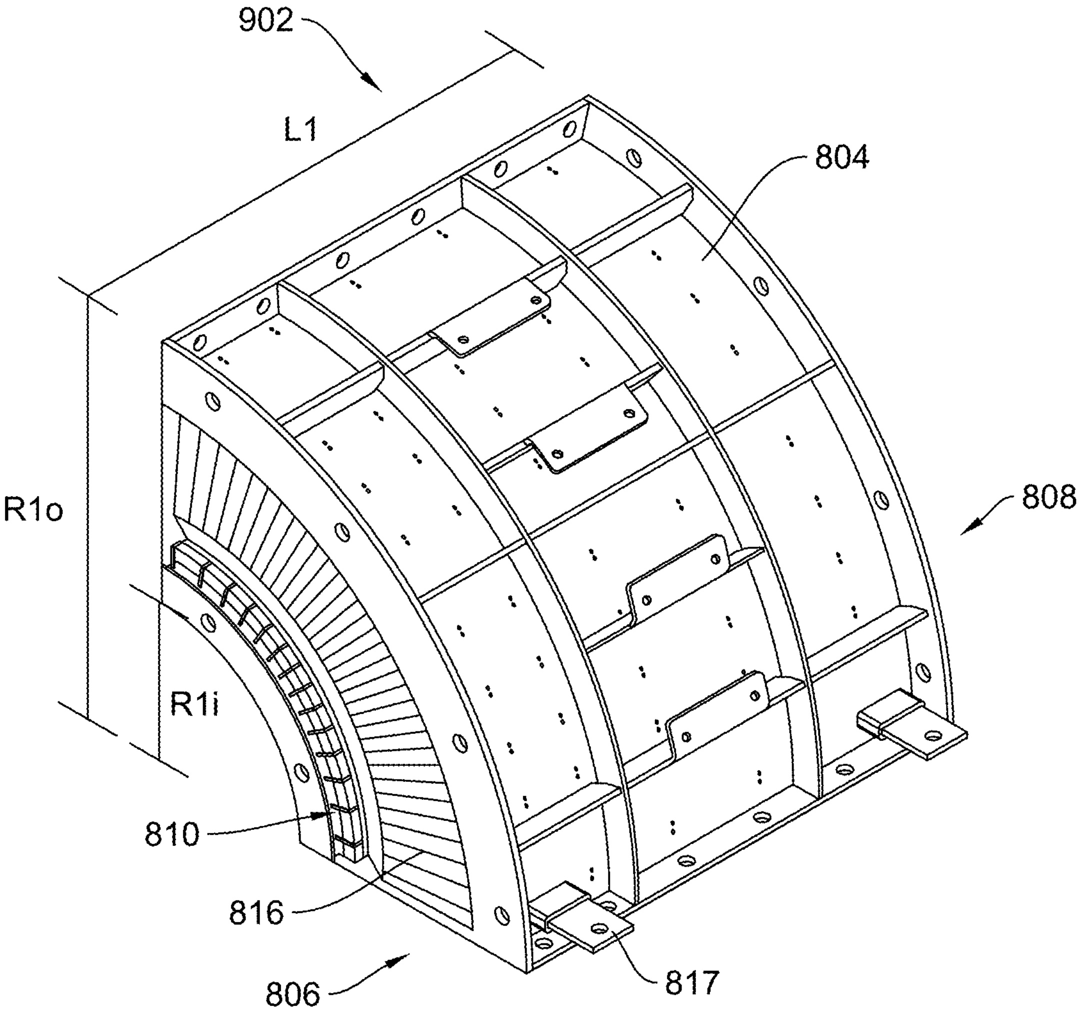
FIG. 9 illustrates perspective view of a first modular resistor grid of the first modular resistor grid assembly of FIG. 8.

The first housing 804 of the first modular resistor grid assembly 802 may also have a first axial length L1 and a first height H1. The first axial length L1 and the first height H1 define the dimensions of the first housing 804 and dictate the amount of space within, and thus the ultimate number of resistor elements 410 which may be disposed inside the first housing 804. In some embodiments, the first axial length L1 may be 600 mm, 700 mm, 900 mm, 1100 mm, 1250 mm, 1300 mm, 1500 mm, or another suitable size. The first height H1 may fall within a similar size range. Accordingly, in some embodiments, the modular resistor grid system 111 may occupy a volume of space roughly 1300 mm by 1300 mm by 1250 mm. As shown in FIG. 9, when the first modular resistor grid assembly 802 is a cylindrically shaped assembly formed from two or more first modular resistor grids 902, the first height H1 may be comprised of a first inner radius R1*i* and a first outer radius R1*o* defined by the inner wall 406 and the outer wall 408 of the first housing 804, respectively. In additional embodiments, the first height H1 may be twice the length of the first outer radius R1*o*.

The first modular resistor grid assembly 802 also includes a first plurality of resistor elements 810 and/or a first plurality of resistor plates 816 connected between the first input terminal and the first output terminal. The first plurality of resistor plates 816 may be components of a first plurality of resistor elements 810, which may be assembled/disposed as a first number of resistor rows 812 within the first housing 804 of the first modular resistor grid assembly 802, as shown in FIG. 10.

Figure 10:
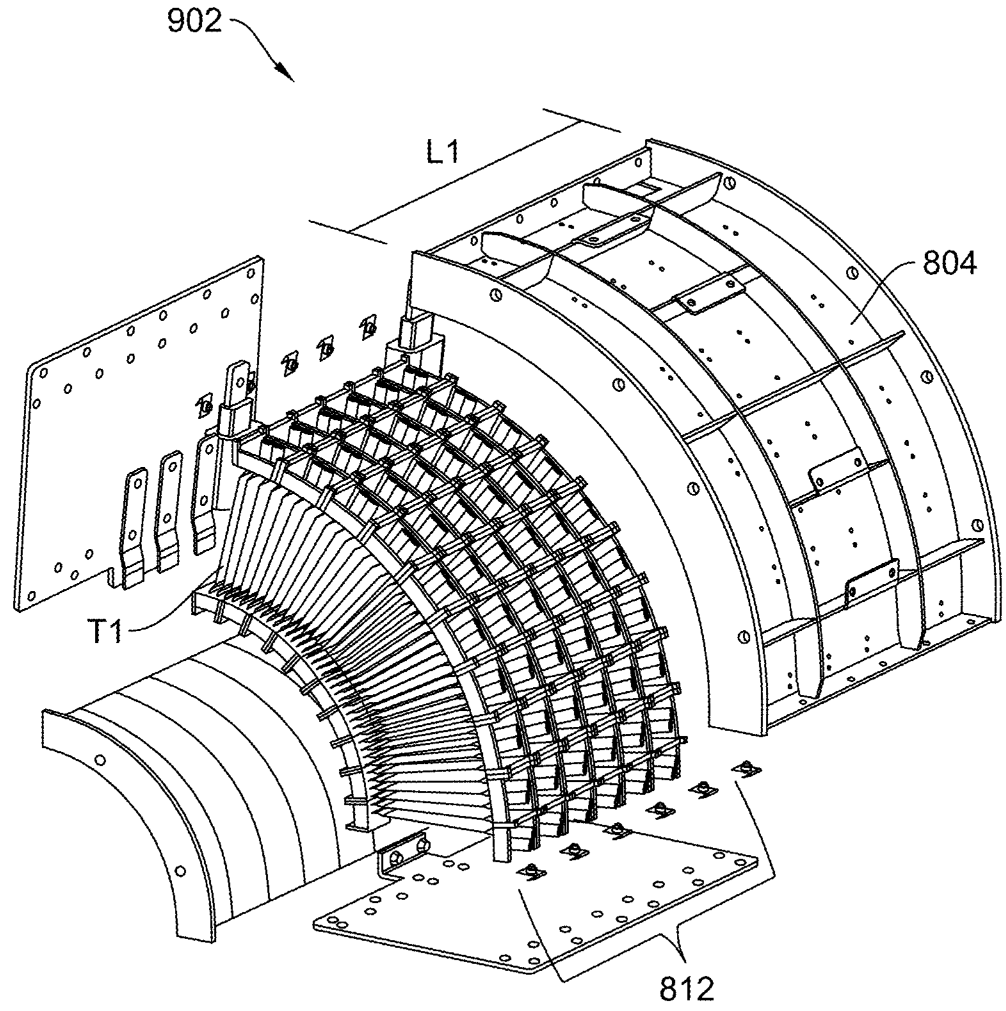
FIG. 10 illustrates an exploded view of the first modular resistor grid of FIG. 9.

For example, FIG. 10 illustrates an exploded view of the first modular resistor grid 902 of FIG. 9. The first housing 804 is disassembled to show the first number of resistor rows 812 disposed within the first housing 804. Here, the first axial length L1 permits a total number of six first resistor rows 812 to fit within the first housing 804. Specifically, in certain embodiments, the first axial length L1 may be about 1100-1110 mm to permit six first resistor rows 812 to be installed in the first housing 804. Further, in this embodiment, each of the first plurality of resistor plates 816 are connected in series between the first input terminal and the first output terminal. As shown, in some embodiments, each of the first plurality of resistor elements 810 and/or resistor plates 816 extend between the inner wall 406 and the outer wall 408 of the first housing 804. Additionally, each of the first resistor plates 816 has a first thickness T1, which may be the same for each of the first resistor plates 816 disposed within the first housing 804.

Figure 11:
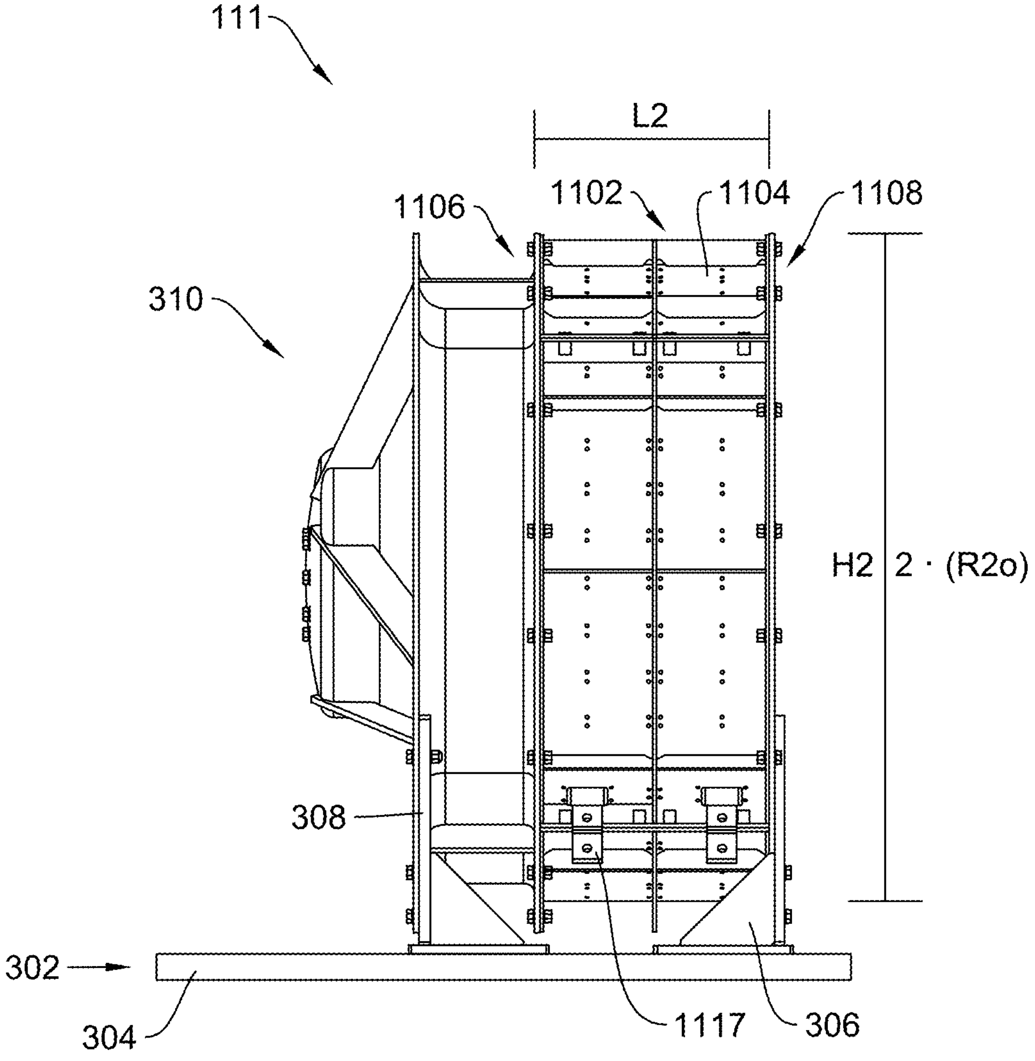
FIG. 11 illustrates a side view of the modular resistor grid system interchangeably coupled to second modular resistor grid assembly, according to an aspect of the disclosure.
Figure 12:
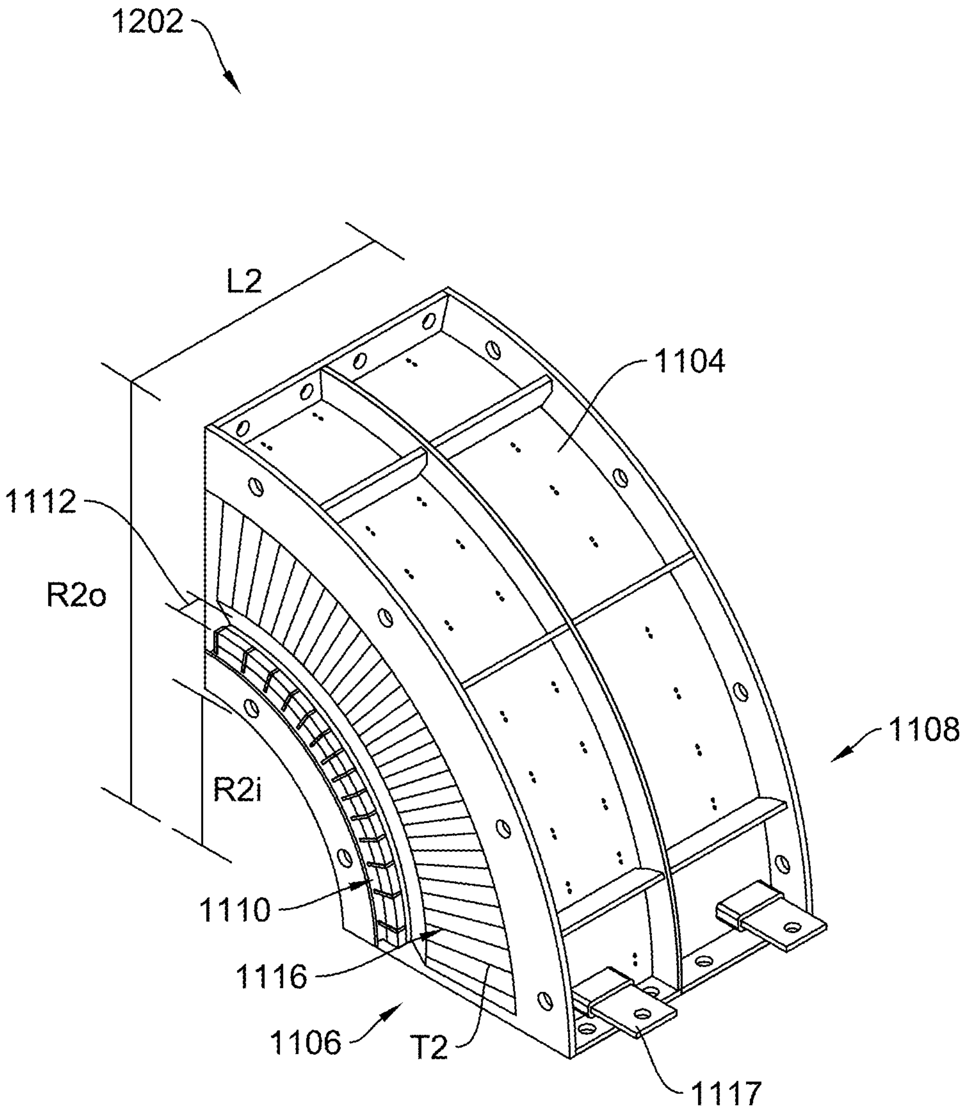
FIG. 12 illustrates a perspective view of a second modular resistor grid of the second modular resistor grid assembly of FIG. 11.

Turning to FIG. 11, another configuration of the modular resistor grid system 111 is illustrated from a side view. The modular resistor grid system 111 in FIG. 11 includes the mount 302 and a second modular resistor grid assembly 1102 shown interchangeably coupled to the mount 302 and the components thereof (e.g., the frame 304, one or more movable brackets 306, and the mounting feature 308). Like the first modular resistor grid assembly 802, the second modular resistor grid assembly 1102 may be formed from one or more of a second modular resistor grid 1202, such as the second modular resistor grid 1202 shown in FIG. 12. The second modular resistor grid assembly 1102 may take on shapes and forms like those discussed above regarding the first modular resistor grid assembly 802. As shown in FIG. 11 and FIG. 12, the second modular resistor grid assembly 1102 may be formed by coupling together four quadrant-shaped second modular resistor grids 1202 to form a cylindrically shaped second modular resistor grid assembly 1102 that may removably couple to the modular resistor grid system 111.

The second modular resistor grid assembly 1102 includes a second housing 1104 which may vary in size in some respects when compared to the first housing 804 (e.g., may vary in axial length, may vary in volume, may vary in housing surface area). In other aspects, the size of the second housing 1104 may be the same or similar to the size of the first housing 804. For example, the second housing 1104 may interchangeably couple to the fan 310 and/or the mounting feature 308 based on a uniform, common, predefined, or otherwise shared height or axial profile. The first housing 804 may first be removed from the fan 310 and the mounting feature 308. The movable brackets 306 may be adjusted to accommodate the second axial length L2 of the second modular resistor grid assembly 1102. Then, the second modular resistor grid assembly 1102 may be coupled to the modular resistor grid system 111. Thus, the second modular resistor grid assembly 1102 may have a second height H2 and an axial profile (e.g., a second outer radius R2$o$, a second inner radius R2$i$, etc.) that are the same as the first height H1 and the first axial profile (e.g., the first outer radius R1$o$, the first inner radius R1$i$) of the first modular resistor grid assembly 802. In this way, both the first modular resistor grid assembly 802 and the second modular resistor grid assembly 1102 may be interchangeably coupled to and be configured to receive cooling air from the same fan 310 and mount to the same frame 304.

Also, like the first modular resistor grid assembly 802, cooling air may flow from the fan 310 in an axial direction between an inlet 1106 and an outlet 1108 of the second modular resistor grid assembly 1102 and across the surface area of multiple resistor elements 410 within the second housing 1104. The second housing 1104 may also define one or more air vents or flow paths to further facilitate convective cooling of the resistor elements 410 disposed therein. Like those shown in FIGS. 4 and 5, the second housing 1104 includes a second input terminal and a second output terminal (located on the opposite side of the second housing 1104 in FIG. 11) configured to electrically connect the modular resistor grid system 111 to a machine 100 (e.g., to a dynamic braking system 200 or a resistive braking system of the machine 100). The terminals 1117 shown in FIGS. 11 and 12 may be configured to electrically connect multiple second modular resistor grids 1202 of the second modular resistor grid assembly 1102 such that one (in series configurations) or more (in parallel configurations) conducting paths extend between the second input terminal and the second output terminal.

The second housing 1104 of the second modular resistor grid assembly 1102 may have a second axial length L2. Notably, as shown in FIG. 11, the second axial length L2 may be shorter than the first axial length L1. In other embodiments, the second axial length L2 may be larger than the first axial length L2. The second axial length L2 and the second height H2 define the dimensions of the second housing 1104 and dictate the amount of space, and thus the ultimate number of resistor elements 410 which may be disposed inside the second housing 1104. In some embodiments, the second axial length L2 may be 350 mm, 450 mm, 550 mm, 625 mm, 650 mm, 750 mm, 850 mm, 900 mm, or another suitable size. The second height H2 may be 700 mm, 900 mm, 1100 mm, 1250 mm, 1300 mm, 1500 mm, or another suitable size (e.g., the same or a similar size to the first height H1). As shown in FIG. 12, when the second modular resistor grid assembly 1102 is a cylindrically shaped assembly formed from two or more second modular resistor grids 1202, the second height H2 may be comprised of a second inner radius R2$i$ and a second outer radius R2$o$ defined by the inner wall 406 and the outer wall 408 of the second housing 1104, respectively.

The second modular resistor grid assembly 1102 also includes a second plurality of resistor elements 1110 and/or a second plurality of resistor plates 1116 connected between the second input terminal and the second output terminal. The second plurality of resistor plates 1116 may be components of a second plurality of resistor elements 1110, which are formed into a second number of resistor rows 1112 (best seen in FIG. 12) within the second housing 1104 of the second modular resistor grid assembly 1102. For example, in embodiments where the second axial length L2 is smaller than the first axial length L1, an exploded view of the second modular resistor grid 1202 may reveal a number of second resistor rows 1112 having two resistor rows (e.g., 1 row, 3 rows, 4 rows, a number less than the number of first resistors rows). Specifically, in one embodiment, the second axial length L2 may be about 760-770 mm to permit three second resistor rows 1112 to be installed within the second housing 1104. In other embodiments where the second axial length L2 is greater than the first axial length L1, the second number of resistor rows 1112 may be greater than the first number of resistor rows 812 (e.g., 7 rows, 8 rows, etc.).

Further, each of the second number of resistor rows 1112 disposed within the second housing 1104 may be formed by the second plurality of resistor plates 1116 connected in series between the second input terminal and the second output terminal. As shown, in some embodiments, each of the second plurality of resistor elements 1110 and/or resistor plates 1116 extend between the inner wall 406 and the outer wall 408 of the second housing 1104. Additionally, each of the second resistor plates 1116 has a second thickness T2, which may be the same for each of the second resistor plates 1116 disposed within the second housing 1104.

The modular resistor grid system 111 may have a target electrical resistance defined between the input terminal and the output terminal. In this way, when the modular resistor grid system 111 is coupled to a machine 100, electric current may flow from the input terminal to the output terminal and the modular resistor grid system 111 may dissipate power as heat. Notably, the plurality of modular resistor grid assemblies 400 (e.g., the first modular resistor grid assembly 802, the second modular resistor grid assembly 1102, other modular resistor grid assemblies of varying shapes/sizes and configured to interchangeably couple to the modular resistor grid system 111) may all have the same target resistance between their respective input terminals and output terminals.

In some embodiments, the thickness of the respective resistor elements 410 within each modular resistor grid assembly 400 may vary to achieve uniform target resistances for each of the plurality of modular resistor grid assemblies 400. For example, the first modular resistor grid assembly 802 with an axial length of L1 has a first number of resistor plates 416 connected in series between the first input terminal and the first output terminal. The second modular resistor grid assembly with a shorter axial length of L2 has a second number of resistor plates 416 connected in series between the second input terminal and the second output terminal. Because the first axial length L1 is larger than the second axial length L2, there is more space/volume within the first modular resistor grid assembly 802 than in the second modular resistor grid assembly 1102. Accordingly, the first number of resistor plates in the first plurality of resistor plates 816 may be greater than the second number of resistor plates in the second plurality of resistor plates 1116. Similarly, the first number of resistor rows 812 may be greater than the second number of resistor rows 1112. In other words, the total length of the conductive path between the first input terminal and the first output terminal may be larger than the total length of the conductive path between the second input terminal and the second output terminal.

In order to maintain the same target electrical resistance between the input terminal and the output terminal of each modular resistor grid assembly 400, 802, 1102, the thickness of resistor elements may change. Specifically, the first thickness T1 of the first plurality of resistor plates 816 may be larger than the second thickness T2 of the second plurality of resistor plates 1116. In this way, the target resistance between each input terminal and output terminal of a respective modular resistor grid assembly 400 may be 3.0 Ohms. In other embodiments, the target resistance may be 1.0 Ohms, 2.0 Ohms, between 3.5 Ohms and 3.8 Ohms, 4.0 Ohms, or other suitable resistance values.

By varying the size of each modular resistor grid assembly 400 and the thicknesses of the resistor plates 416 within each respective modular resistor grid assembly 400, the power dissipation associated with the modular resistor grid system may remain uniform while the watt density of the modular resistor grid system 111 may change as one modular resistor grid assembly (e.g., the first modular resistor grid assembly 802) is removed and replaced by another modular resistor grid assembly (e.g., the second modular resistor grid assembly 1102). In some embodiments, the watt density of the modular resistor grid system 111 may vary between 10 watts/inch$^2$ and 60 watts/inch$^2$.

More particularly and as an illustration, the first modular resistor grid assembly 802 of FIG. 8 may be configured to dissipate 1 MW of power and have a watt-density of 21 watts/inch$^2$. Similarly, the second modular resistor grid assembly 1102 of FIG. 11 may be configured to dissipate 1 MW of power and have a watt-density of 42 watts/inch$^2$. Because the first modular resistor grid assembly 802 and the second modular resistor grid assembly 1102 may be interchangeably coupled to the modular resistor grid system 111, an operator may selectively install or interchange the active modular resistor grid assembly depending on the environment in which the machine 100 is operating. This interchangeability beneficially allows the selection of optimized thermodynamic, electrical, and spatial properties tailored to current operating conditions. For example, the first modular resistor grid assembly 802, having a relatively low watt-density and relatively large surface area for heat convection, may be referred to as a "high-altitude" assembly. At high altitudes where air density is lower and mass flow rate of cooling air decreases for fan assemblies when compared to low altitude conditions, installing the first modular resistor grid assembly 802 increases the likelihood that the modular resistor grid system 111 receives cooling air over a sufficient surface area to operate at maximum resistive braking capacity. Conversely, the second modular resistor grid assembly, having a relatively high watt-density and smaller surface area for heat convection, may be referred to as a "low-altitude" assembly. At low altitudes where air density increases and mass flow rate of cooling air is greater for fan assemblies when compared to high altitude conditions, less surface area for cooling may be required to operate at maximum resistive braking capacity and mass/space can be saved by installing a modular resistor grid assembly with a smaller size (e.g., smaller axial length).

While the modular resistor grid assemblies 400, 802, 1102, may be interchangeably coupled to the modular resistor grid system 111, the modular resistor grid system 111 may be configured to dissipate a predetermined amount of power as heat during the resistive braking mode regardless of which modular resistor grid assembly 400, 802, 1102 is installed. For example, the modular resistor grid system 111 may be configured to have a continuous power capacity of about 100 kW, 250 kW, 500 kW, 750 kW, 1 MW, 2 MW, 5 MW, 6 MW, 7 MW, 8 MW, 9 MW, 9.5 MW, or 10 MW. In other embodiments, the modular resistor grid system 111 has a continuous capacity of about 10 MW or greater. In some embodiments, the modular resistor grid system 111 has a continuous power capacity of about 500 kW to about 2 MW.

Exemplary Method of Manufacturing a Modular Resistor Grid Assembly

Figure 13:
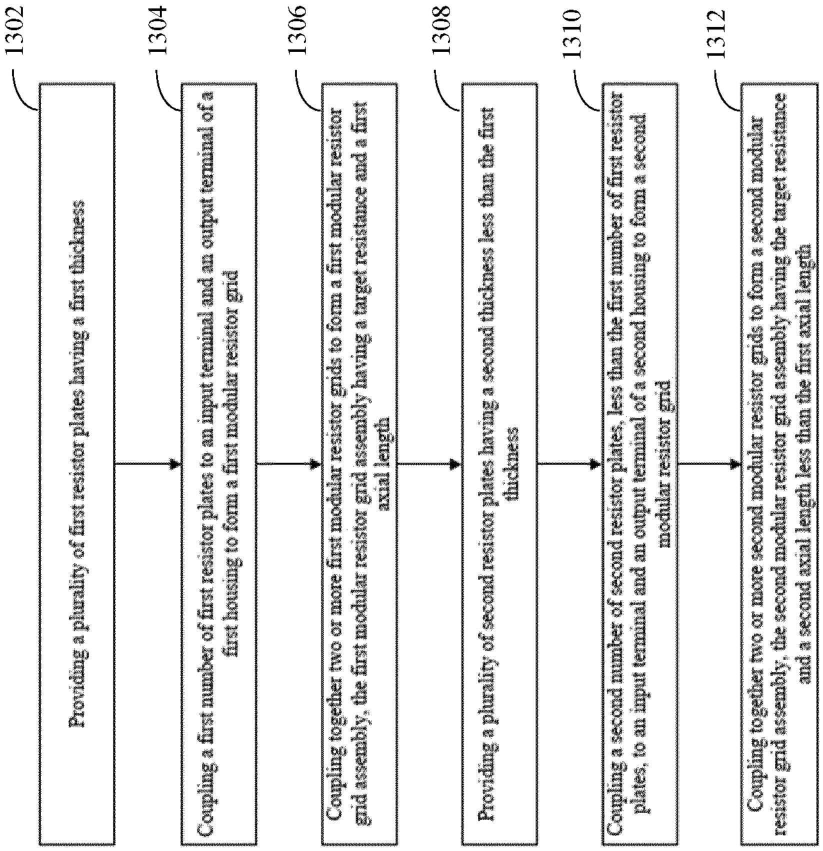
FIG. 13 illustrates a flow chart for a method of manufacturing a modular resistor grid assembly described herein.

FIG. 13 illustrates exemplary steps for manufacturing the modular resistor grid system 111 described above. These steps may be performed in a different order than the exemplary order shown in FIG. 13. Additionally, steps may be repeated, separated by optional steps or intervening steps, or expanded upon to include additional actions. All such iterations of the manufacturing process as would be apparent to a person of ordinary skill in the art are contemplated within this disclosure.

At step 1302, the method includes providing a plurality of first resistor plates having a first thickness. At this step, multiple resistor plates (e.g., a plurality of first resistor plates 816) are formed and provided for assembly into a modular resistor grid 402 and/or a modular resistor grid assembly 400. The resistor plates may be formed by stamping, laser cutting, water jet cutting, molding, or other suitable methods. The resistor plates may also be formed from stainless steel, iron, metallic coils, metal alloys, or other suitable conductive materials. Additionally, at this step, the number of first resistor plates 816 in the plurality of first resistor plates 816 may be determined. This number may be used to calculate the total length of the conductive path for the modular resistor grid assembly 400. By utilizing the total length, the density of the resistor plate 816 material, and the cross-sectional area of each plate, a first thickness may be determined to achieve a target resistance between the input terminal and the output terminal of the modular resistor grid assembly 400 formed with the plurality of first resistor plates 816. For example, in a particular embodiment, a number of first resistor plates 816 may be provided to fill six rows in the first housing 804. To achieve a target resistance of approximately between 3.1 and 3.8 Ohms, the first thickness may be about 1.12 mm for each of the first resistor plates 816.

At step 1304, the method includes coupling a first number of first resistor plates to an input terminal and an output terminal of a first housing to form a first resistor grid. At this step, the first resistor plates 816 are installed/fixed within the first housing 804 to create an electrical conducting path between the first input terminal and the first output terminal. This step may include coupling the plurality of first resistor plates 416 together to form one or more first resistor rows 812 of first resistor plates 816. For example, the first plurality of resistor plates 816 (as best shown in FIGS. 9 and 10) may be seem welded at their tip portions to form a continuous conductive path of resistor plates 816. The first resistor plates 816 may then be disposed within a first plurality of insulator blocks (e.g., disposed between a first insulator 412 and a second insulator 414) to form rows of first resistor elements 810. The first resistor elements 810 may then be placed adjacent to the first housing, where the insulator blocks are coupled to one or more walls of the first housing 804. The first modular resistor grid 902 shown in FIG. 9 may thus be formed when the plurality of first resistor elements 810 are affixed within the first housing 804. As shown in FIGS. 9 and 10, the plurality of first resistor elements 810 may be assembled in a first housing 804 having a first outer radius R1*o*, a first inner radius R1*i*, and/or a first diameter (e.g., H1).

At step 1306, the method includes coupling together two or more first resistor grids 902 to form a first modular resistor grid assembly 802. For example, coupling together four of the first modular resistor grids 902 as shown in FIG. 9 results in the first modular resistor grid assembly 802 shown in FIG. 8. The first modular resistor grid assembly 802 includes a first target resistance (e.g., about 3.0-4.0 Ohms) and a first axial length L1 (e.g., about 600 mm, 700 mm, 900 mm, 1100 mm, 1250 mm, 1300 mm, 1500 mm, etc.).

At step 1308, the method includes providing a plurality of second resistor plates having a second thickness. At this step, the plurality of second resistor plates (e.g., resistor plates 1116) may have a second thickness that is less than or greater than the first thickness. For example, providing a smaller number of resistor plates having a greater thickness when compared to the first plurality of resistor plates 416 may result in a "low altitude" modular resistor grid assembly 400 when assembled.

At step 1310, the method includes coupling a second number of second resistor plates to an input terminal and an output terminal of a second housing to form a second resistor grid. Like step 1304 above, the second resistor plates 1116 are installed/fixed within the second housing 1104 to create an electrical conducting path between the second input terminal and the second output terminal. This step may also include coupling a plurality of second resistor plates 1116 together to form one or more second resistor rows 1112. Additionally, in some embodiments, the first number of first resistor plates 816 is greater than the second number of second resistor plates 1116. In other embodiments, this may be reversed. In some embodiments, the first number of first resistor rows 812 is greater than the second number of second resistor rows 1112 (e.g., FIG. 9 compared to FIG. 12 above). Also, like step 1304, this step may include disposing the second plurality of second resistor plates 1116 between insulator blocks and affixing a second plurality of resistor elements 1110 to one or more walls of the second housing 1104 to form a second modular resistor grid 1202. As shown in FIGS. 11 and 12, the plurality of second resistor elements 1110 may be assembled in a second housing 1104 having a second outer radius R2*o*, a second inner radius R2*i*, and/or a second diameter (e.g., H2). In some embodiments, the inner radius, outer radius, diameter, and/or height of the first and second housings are the same such that the first and second modular resistor grid assemblies may interchangeably coaxially connect to the fan 310.

At step 1312, the method includes coupling together two or more second resistor grids 1202 to form a second modular resistor grid assembly 1102 (e.g., coupling together four second modular resistor grids 1202 shown in FIG. 12 to form a second modular resistor grid assembly 1102 shown in FIG. 11). The second modular resistor grid assembly 1102 may have a second target resistance and a second axial length L2. In some embodiments, the first target resistance is equal to the second target resistance. Additionally, in some embodiments, the first axial length L1 is greater than the second axial length L2. Based on (i) the first axial length L1 being greater than the second axial length L2, (ii) the first number of first resistor rows 812 being greater than the second number of second resistor rows 1112, and (iii) the first thickness being greater than the second thickness, the second modular resistor grid assembly 1102 may have a greater watt-density than the first modular resistor grid assembly 802. In other embodiments, each of the plurality of modular resistor grid assemblies 400 may have a watt density between 10 watts/inch$^2$ and 60 watts/inch$^2$.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the various exemplary embodiments is illustrative only. Additionally, any element disclosed in one embodiment may be incorporated or utilized with any other embodiment disclosed herein.

What is claimed is:

1. A modular resistor grid system comprising:

a mount;

a plurality of modular resistor grid assemblies configured to interchangeably couple to the mount, the plurality of modular resistor grid assemblies including a first modular resistor grid assembly and a second modular resistor grid assembly, the plurality of modular resistor grid assemblies each comprising:

- a housing having an input terminal and an output terminal;
- a plurality of resistor plates connected between the input terminal and the output terminal, each resistor plate having a thickness, the plurality of resistor plates providing a target resistance for the respective modular resistor grid assembly between the input terminal and the output terminal;

wherein each modular resistor grid assembly has the same target resistance, wherein the first modular resistor grid assembly comprises a first number of resistor plates with a first thickness and the second modular resistor grid assembly comprises a second number of resistor plates with a second thickness, and wherein the first number is greater than the second number, and the first thickness is greater than the second thickness.

2. The modular resistor grid system of claim 1, wherein the mount further comprises a movable bracket configured to interchangeably couple to one or more of a fan or a respective modular resistor grid assembly of the plurality of modular resistor grid assemblies.

3. The modular resistor grid system of claim 1, wherein a fan is configured to interchangeably coaxially couple to each of the plurality of modular resistor grid assemblies.

4. The modular resistor grid system of claim 1, wherein:
the first modular resistor grid assembly comprises a first number of resistor rows;
the second modular resistor grid assembly comprises a second number of resistor rows; and
the first number of resistor rows is greater than the second number of resistor rows.

5. The modular resistor grid system of claim 1, wherein each of the plurality of modular resistor grid assemblies further comprises a plurality of modular resistor grids coupled together.

6. The modular resistor grid system of claim 5, wherein:
each of the plurality of modular resistor grids is a quadrant having an inner radius and an outer radius; and
each of the resistor plates extends between the inner radius and the outer radius.

7. The modular resistor grid system of claim 1, wherein the plurality of resistor plates is connected in series between the input terminal and the output terminal.

8. The modular resistor grid system of claim 1, wherein each of the at least two modular resistor grid assemblies has a watt density between 10 watts/inch$^2$ and 60 watts/inch$^2$.

9. A modular resistor grid system, the system comprising:
a mount;
a fan;
a plurality of modular resistor grid assemblies configured to interchangeably couple to the mount and the fan, the plurality of modular resistor grid assemblies including a first modular resistor grid assembly and a second modular resistor grid assembly, the plurality of modular resistor grid assemblies each comprising:
a housing,
an input terminal and an output terminal coupled to the housing,
a number of resistor rows disposed within the housing and connecting the input terminal to the output terminal, each of the resistor rows comprising a plurality of resistor plates having a thickness, the plurality of resistor plates providing a target resistance for the respective modular resistor grid assembly between the input terminal and the output terminal;
wherein each modular resistor grid assembly has the same target resistance, wherein the housing of the first modular resistor grid assembly extends a first length in an axial direction and the housing of the second modular resistor grid assembly extends a second length in the axial direction less than the first length, wherein the first modular resistor grid assembly comprises a first number of resistor plates with a first thickness and the second modular resistor grid assembly comprises a second number of resistor plates with a second thickness, and wherein the first number is greater than the second number, and the first thickness is greater than the second thickness.

10. The modular resistor grid system of claim 9, wherein the mount further comprises a movable bracket configured to interchangeably couple to at least the first modular resistor grid assembly and the second modular resistor grid assembly.

11. The modular resistor grid system of claim 9, wherein:
the first modular resistor grid assembly comprises a plurality of first resistor grid quadrants, each first resistor grid quadrant having an inner radius and an outer radius; and
the second modular resistor grid assembly comprises a plurality of second resistor grid quadrants, each second resistor grid quadrant having the inner radius and the outer radius.

12. The modular resistor grid system of claim 9, wherein:
the first modular resistor grid assembly comprises a first number of resistor rows;
the second modular resistor grid assembly comprises a second number of resistor rows;
the first number of resistor rows are connected in series between the input terminal and the output terminal of the housing of the first modular resistor grid assembly; and
the second number of resistor rows are connected in series between the input terminal and the output terminal of the housing of the second modular resistor grid assembly.

13. The modular resistor grid system of claim 9, wherein:
the mount has a first end, a second end, and a frame defining a mount length extending in the axial direction between the first end and the second end; and
the fan is configured to be coupled to the mount at one or more locations along the mount length.

14. The modular resistor grid system of claim 9, wherein the first modular resistor grid assembly and the second modular resistor grid assembly each has a watt density between 10 watts/inch$^2$ and 60 watts/inch$^2$.

15. The modular resistor grid system of claim 14, wherein the second modular resistor grid assembly has a greater watt density than the first modular resistor grid assembly.

16. A method of manufacturing a modular resistor grid assembly, the method comprising:
providing a plurality of first resistor plates having a first thickness;
coupling a first number of first resistor plates to an input terminal and an output terminal of a first housing to form a first modular resistor grid;
coupling together two or more first modular resistor grids to form a first modular resistor grid assembly, the first modular resistor grid assembly having a first target resistance and a first axial length;
providing a plurality of second resistor plates having a second thickness;
coupling a second number of second resistor plates to an input terminal and an output terminal of a second housing to form a second modular resistor grid;
coupling together two or more second modular resistor grids to form a second modular resistor grid assembly, the second modular resistor grid assembly having a second target resistance and a second axial length;
wherein:
the first target resistance is equal to the second target resistance,
the first thickness is greater than the second thickness,
the first number of first resistor plates is greater than the second number of second resistor plates, and
the first axial length is greater than the second axial length.

17. The method of claim 16, further comprising:
coupling two or more of first resistor plates together to form a row of first resistor plates; and
coupling two or more of second resistor plates together to form a row of second resistor plates.

18. The method of claim 16, further comprising:
disposing a first plurality of insulator blocks between the first number of first resistor plates and a wall of the first housing; and disposing a second plurality of insulator blocks between the second number of second resistor plates and a wall of the second housing.

19. The method of claim 16, wherein:

each of the first modular resistor grid assembly and the second modular resistor grid assembly has a watt density between 10 watts/inch$^2$ and 60 watts/inch$^2$; and the second modular resistor grid assembly has a greater watt density than the first modular resistor grid assembly.

20. The method of claim 16, wherein:

the first modular resistor grid assembly has an inner diameter and an outer diameter; and the second modular resistor grid assembly has the inner diameter and the outer diameter.

* * * * *